United States Patent
Liu et al.

(10) Patent No.: US 10,740,491 B2
(45) Date of Patent: Aug. 11, 2020

(54) METHOD AND DEVICE FOR VERIFYING INSTRUCTIONS OF DIAGNOSTIC EQUIPMENT, AND LOWER COMPUTER

(71) Applicant: SHENZHEN LAUNCH SOFTWARE CO., LTD., Shenzhen, Guangdong (CN)

(72) Inventors: Jun Liu, Guangdong (CN); Xiaobing Zhao, Guangdong (CN); Wei Yan, Guangdong (CN); Guozhu Liu, Guangdong (CN)

(73) Assignee: SHENZHEN LAUNCH SOFTWARE CO., LTD., Shenzhen, Guangdong (CN)

( * ) Notice: Subject to any disclaimer, the term of this patent is extended or adjusted under 35 U.S.C. 154(b) by 301 days.

(21) Appl. No.: 15/871,892

(22) Filed: Jan. 15, 2018

(65) Prior Publication Data
US 2019/0205570 A1    Jul. 4, 2019

Related U.S. Application Data

(63) Continuation-in-part of application No. PCT/CN2017/119571, filed on Dec. 28, 2017.

(51) Int. Cl.
*G06F 21/64* (2013.01)
*G06F 21/44* (2013.01)
(Continued)

(52) U.S. Cl.
CPC .............. *G06F 21/64* (2013.01); *G06F 8/65* (2013.01); *G06F 21/44* (2013.01); *G06F 21/602* (2013.01)

(58) Field of Classification Search
CPC ........ G06F 21/64; G06F 21/44; G06F 21/602; G06F 8/65; G06F 21/606; G05B 23/0221
See application file for complete search history.

(56) References Cited

U.S. PATENT DOCUMENTS

| 8,479,190 B2 * | 7/2013 | Sueyoshi | G06F 8/65 |
| | | | 709/223 |
| 8,966,248 B2 * | 2/2015 | Baltes | H04L 9/3247 |
| | | | 713/155 |

(Continued)

FOREIGN PATENT DOCUMENTS

| CN | 102736615 | 10/2012 |
| CN | 103287400 | 9/2013 |

(Continued)

OTHER PUBLICATIONS

International Search Report, issued in the corresponding PCT application No. PCT/CN2017/119571, dated Sep. 20, 2018, 4 pages.

(Continued)

*Primary Examiner* — Christopher A Revak
(74) *Attorney, Agent, or Firm* — Hamre, Schumann, Mueller & Larson, P.C.

(57) ABSTRACT

A method for verifying instructions of diagnostic equipment is used to solve a technical problem that a lower computer of the diagnostic equipment is prone to be cheated by an upper computer, this method comprises: obtaining first verification data sent from the upper computer of the diagnostic equipment, wherein the diagnostic equipment carries the first verification data when a software version of the diagnostic equipment is updated, the first verification data is encrypted and comprises a set of instructions sent from the upper computer to the lower computer in a corresponding software version; decrypting the first verification data to obtain the set of instructions; comparing instruction data received from the upper computer with the set of instructions, and judging whether the instruction data comply with the set of instructions; if the instruction data comply with the set of instructions, executing the instruction data; and if the (Continued)

instruction data doesn't comply with the set of instructions, refusing to execute the instruction data.

12 Claims, 4 Drawing Sheets

(51) Int. Cl.
*G06F 8/65* (2018.01)
*G06F 21/60* (2013.01)

(56) References Cited

U.S. PATENT DOCUMENTS

| | | | | |
|---|---|---|---|---|
| 10,057,243 B1* | 8/2018 | Kumar | .................... | H04L 9/321 |
| 2012/0124567 A1* | 5/2012 | Landry | ............... | G06F 11/1433 |
| | | | | 717/168 |
| 2013/0185564 A1* | 7/2013 | Jaber | ..................... | G06F 21/572 |
| | | | | 713/176 |
| 2015/0170145 A1* | 6/2015 | Patel | ......................... | G06F 8/20 |
| | | | | 705/44 |
| 2017/0041290 A1 | 2/2017 | Ning et al. | | |
| 2017/0060559 A1* | 3/2017 | Ye | .............................. | G06F 8/65 |
| 2017/0098070 A1 | 4/2017 | Ning et al. | | |
| 2018/0145991 A1* | 5/2018 | McCauley | .......... | H04L 63/0428 |
| 2018/0316502 A1* | 11/2018 | Nadeau | .................. | G06N 20/00 |
| 2019/0056925 A1* | 2/2019 | Komano | ............. | H04L 41/0866 |
| 2019/0058713 A1* | 2/2019 | Pala | ...................... | H04L 63/105 |

FOREIGN PATENT DOCUMENTS

| | | |
|---|---|---|
| CN | 106982213 | 7/2017 |
| WO | 2004/038360 | 5/2004 |

OTHER PUBLICATIONS

The extended European search report issued in European Patent Application No. 17832027.1, dated Nov. 27, 2019, 8 pages provided.

* cited by examiner

METHOD AND DEVICE FOR VERIFYING INSTRUCTIONS OF DIAGNOSTIC EQUIPMENT, AND LOWER COMPUTER

TECHNICAL FIELD

The present application relates to the technical field of vehicle electronics, and more particularly, relates to a method and device for verifying instructions of diagnostic equipment, and a lower computer.

BACKGROUND

With a rapid development of vehicle electronics technology, functionalities of vehicles are becoming more and more complicated, and vehicle diagnosis is becoming more and more important, vehicle diagnostic equipments play a very important role in people's daily lives. As for the diagnostic equipment, lower computer programs of the diagnostic equipment are core programs that serve to communicate with an ECU (Electronic Control Unit) of vehicle. Due to development of vehicles, the lower computer programs of the diagnostic equipment need to be updated to be supportive of diagnosis of new types of vehicles, diagnostic software and the lower computer programs work as a whole by combination and coexistence.

However, a lawbreaker may operate an upper computer reversely so as to use data of a certain type of vehicle to cheat the lower computer of the diagnostic equipment, thereby evading a validity check of the lower computer programs, and achieving a purpose of illegally communicating with the ECU of the vehicle.

Technical Problem

Embodiments of the present application provide a method and device for verifying instructions of diagnostic equipment, and a lower computer, which can exclude any possibility of reversely using data of a certain type of vehicle to cheat a lower computer of the diagnostic equipment through an upper computer, thereby improving the safety of the lower computer of the diagnostic equipment.

Technical Solution

In a first aspect, a method for verifying instructions of diagnostic equipment is provided, the method for verifying instructions of diagnostic equipment is applied in a lower computer of the diagnostic equipment and comprises:

obtaining first verification data sent from an upper computer of the diagnostic equipment, wherein the diagnostic equipment carries the first verification data when a software version of the diagnostic equipment is updated, the first verification data is encrypted and comprises a set of instructions sent from the upper computer to the lower computer in a corresponding software version;

decrypting the first verification data to obtain the set of instructions; and comparing instruction data received from the upper computer with the set of instructions, and judging whether the instruction data comply with the set of instructions;

executing the instruction data if the instruction data comply with the set of instructions; or refusing to execute the instruction data if the instruction data doesn't comply with the set of instructions.

Optionally, the first verification data further comprises a version certificate, the version certificate is generated by a server configured to provide updated software version;

a step of decrypting the first verification data to obtain the set of instructions specifically comprises:

decrypting the first verification data to obtain the set of instructions and the version certificate;

before comparing the instruction data received from the upper computer with the set of instructions, the method further comprises:

checking whether the version certificate is legalized;

executing the step of comparing the instruction data received from the upper computer with the set of instructions if the version certificate is legalized; or ending this diagnosis operation if the version certificate is illegal.

Optionally, after the instruction data is executed, the method further comprises:

judging whether this diagnosis operation has already been accomplished;

if this diagnosis operation hasn't been accomplished, receiving a next instruction data from the upper computer, and returning to execute the step of comparing the instruction data received from the upper computer with the set of instructions; or if this diagnosis operation has been accomplished, ending this diagnosis operation.

Optionally, judging whether the instruction data comply with the set of instructions comprises:

judging whether the instruction data belongs to the set of instructions;

determining that the instruction data comply with the set of instructions if the instruction data belongs to the set of instructions; or determining that the instruction data doesn't comply with the set of instructions if the instruction data doesn't belong to the set of instructions.

Optionally, the first verification data is obtained by using the server configured to provide updated software version to encrypt a pre-stored set of instructions corresponding to a software version that is required to be downloaded after the server receives a software version download instruction; the pre-stored set of instructions is a set of instructions that is generated, after all instructions sent from the upper computer to the lower computer in a software version to be published by the diagnostic equipment are extracted by a software version publisher, by the all instructions; the set of instructions and the software version to be published are associated and published on the server configured to provide updated software version.

In a second aspect, a device for verifying instructions of diagnostic equipment is provided, the device for verifying instructions of diagnostic equipment is applied in a lower computer of the diagnostic equipment and comprises:

an verification data obtaining module configured to obtain first verification data sent from an upper computer of the diagnostic equipment, wherein the diagnostic equipment carries the first verification data when a software version of the diagnostic equipment is updated, the first verification data is encrypted and comprises a set of instructions sent from the upper computer to the lower computer in a corresponding software version;

a verification data decrypting module configured to decrypt the first verification data to obtain the set of instructions; and an instruction verification module configured to compare instruction data received from the upper computer with the set of instructions, and judge whether the instruction data comply with the set of instructions;

an execution module configured to, if the instruction data comply with the set of instructions, execute the instruction data; and an execution refusing module configured to, if the instruction data doesn't comply with the set of instructions, refuse to execute the instruction data.

Optionally, the first verification data further comprises a version certificate, the version certificate is generated by a server configured to provide updated software version;

the verification data decrypting module is specifically configured to encrypt the first verification data to obtain the set of instructions and the version certificate;

the instruction verification module further comprises:

a certificate checking module configured to check whether the version certificate is legalized;

a triggering module configured to, if the version certificate is legalized, trigger the certificate verification module; and a diagnosis ending module configured to, if the version certificate is illegal, end this diagnosis operation.

Optionally, the instruction verification module further comprises:

a diagnosis accomplishment judging module configured to judge whether this diagnosis operation has already been accomplished;

an instruction receiving module configured to, if the diagnosis accomplishment judging module gets a negative judgment, receive a next instruction data from the upper computer to trigger the instruction verification module again; and an operation ending module configured to, if the diagnosis accomplishment judging module gets a positive judgment, end this diagnosis operation.

Optionally, the instruction verification module further comprises:

an instruction judging unit configured to judge whether the instruction data belongs to the set of instructions;

a first determining unit configured to, if the instruction judging unit gets a positive judgment, determine that the instruction data complies with the set of instructions; and a second determining unit configured to, if the instruction judging unit gets a negative judgment, determine that the instruction data doesn't comply with the set of instructions;

Optionally, the first verification data is obtained by the server configured to provide updated software version by encrypting a pre-stored set of instructions corresponding to a software version that is required to be downloaded after the server receives a software version download instruction; the pre-stored set of instructions is, after all instructions sent from the upper computer to the lower computer in a software version to be published by the diagnostic equipment are extracted by a software version publisher, the one generated by the all instructions; the set of instructions and the software version to be published are associated and published on the server configured to provide updated software version.

In a third aspect, a method for publishing software version of diagnostic equipment is provided, wherein the method comprises:

extracting all instructions sent from an upper computer to a lower computer in a software version to be published by the diagnostic equipment;

encrypting and storing the all instructions as a set of instructions;

associating the set of instructions with the software version and publishing the set of instructions and the software version on a designated server.

In a fourth aspect, a lower computer of diagnostic equipment is provided, which comprises a storage device, a processor, and computer programs stored in the storage device and executable on the processor, wherein the processor implements the steps of the above-described method for verifying instructions of diagnostic equipment when executing the computer programs.

In a fifth aspect, a computer readable storage device medium is provided, the computer readable storage medium stores computer programs, wherein the computer programs implements the above-described steps of the method for verifying instructions of the diagnostic equipment when being executed by a processor.

Advantageous Effects

It can be seen from the technical solutions described above that, the embodiments of the present application have following advantages:

In the embodiments of the present application, the lower computer of the diagnostic equipment obtains the first verification data sent by the upper computer of the diagnostic equipment firstly, the diagnostic equipment carries the first verification data when it updates software version, the first verification data is encrypted and comprises the set of instructions sent from the upper computer to the lower computer in the corresponding software version; then, the first verification data is decrypted, and the set of instructions are obtained; next, the instruction data received from the upper computer is compared with the set of instructions, and whether the instruction data comply with the set of instructions is judged. If the instruction data comply with the set of instructions, the instruction data is executed; if the instruction data doesn't comply with the set of instructions, an execution of the instruction data is refused. In this embodiment of the present application, since the diagnostic equipment carries the set of instructions sent from the upper computer to the lower computer in the software version when it updates the software version, after the lower computer receives the instruction data from the upper computer, it can judge whether the instruction data comply with the requirement of the set of instructions, and thus a verification of the instruction data can be accomplished; any possibility of reversely using data of a certain vehicle type to cheat the lower computer of the diagnostic equipment through the upper computer is excluded, and thus a safety of the lower computer of the diagnostic equipment is improved.

BRIEF DESCRIPTION OF THE DRAWINGS

In order to explain the embodiments of the present application or the technical solutions in the prior art more clearly, a brief introduction regarding the accompanying drawings that need to be used for describing the embodiments or the prior art is given below; it is obvious that the accompanying drawings described as follows are only some embodiments of the present application, for those skilled in the art, other drawings can be obtained according to the current drawings on the premise of paying no creative labor.

DETAILED DESCRIPTION OF THE PREFERRED EMBODIMENTS

The embodiment of the present application provides a method and device for verifying instructions of diagnostic equipment, and a lower computer, which aims at solving a technical problem that a lower computer of the diagnostic equipment is prone to be cheated by an upper computer.

In order to make the purpose, technical features and advantages of the present application be more obvious and more understandable, technical solutions in the embodiments of the present application will be described clearly and comprehensively with reference to accompanying drawings in the embodiments, it is obvious that, the embodiments described below are merely part of the embodiments of the present application, but not the whole of the embodiments. Based on the embodiments in the present application, some other embodiments, which are obtained by one of ordinary skill in the art at the premise of paying no creative labor, are all included in the protection scope of the present application.

Figure 1:
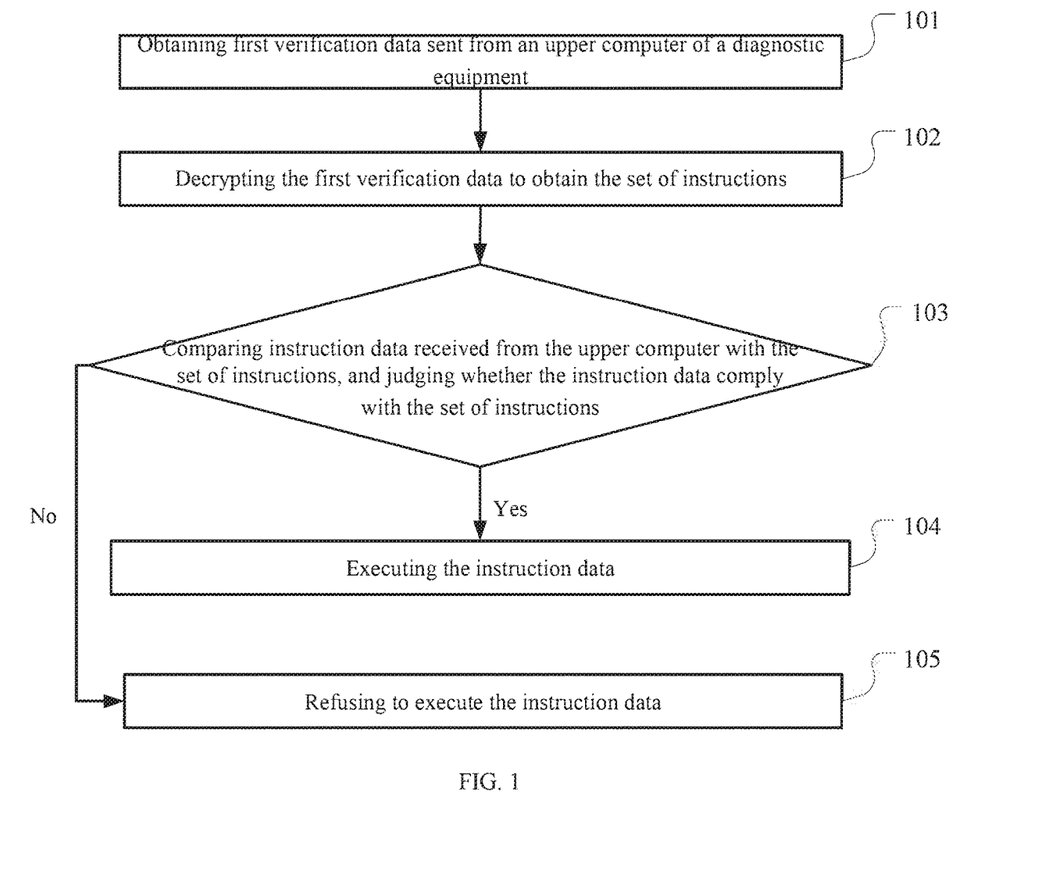
FIG. 1 illustrates an exemplary flow chart of a method for verifying instructions of a diagnostic equipment in one embodiment of the present application.

Please refer to FIG. 1, an example of a method for verifying instructions of diagnostic equipment in an embodiment of the present application comprises:

step 101, obtaining first verification data sent from an upper computer of the diagnostic equipment, the diagnostic equipment carries the first verification data when a software version of the diagnostic equipment is updated, the first verification data is encrypted and contains a set of instructions sent from the upper computer to the lower computer in a corresponding software version.

In this embodiment, the method for verifying instructions of the diagnostic equipment is applied in the lower computer of the diagnostic equipment. It can be understood that, when the diagnostic equipment is activated to perform this diagnosis operation, the upper computer of the diagnostic device can send instruction data to the lower computer, when or before the upper computer sends the instruction data, it still needs to send the first verification data to the lower computer.

The first verification data is carried in the software version when the diagnostic equipment updates the software version, the first verification data has been encrypted and comprises the set of instructions sent from the upper computer to the lower computer.

Preferably, in an application scenario, the first verification data can be obtained by using a server configured to provide updated software version to encrypt a pre-stored set of instructions corresponding to a software version that requires to be downloaded after the server receives a software version download instruction; the pre-stored set of instructions can be, after all instructions sent from the upper computer to the lower computer in a software version to be published by the diagnostic equipment are extracted by a software version publisher, the one generated by the all instructions, and the set of instructions and the software version to be published are associated and published on the server configured to provide updated software version.

For facilitating understanding the origination of the first verification data, a publishing process of the software version of the diagnostic equipment will be described herein with reference to an application scenario.

Figure 2:
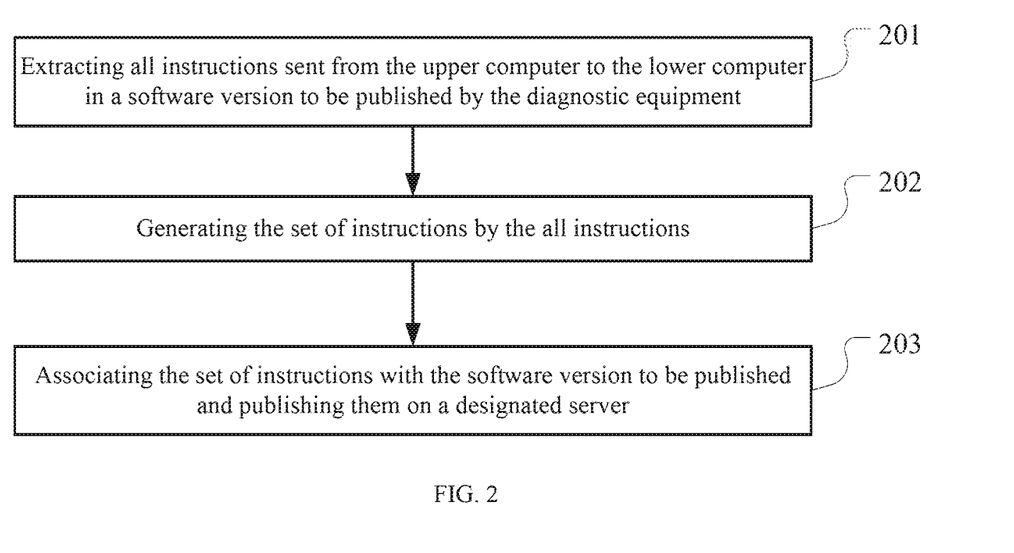
FIG. 2 illustrates an exemplary flow chart of a method for publishing software version of the diagnostic equipment in another embodiment of the present application.

Please refer to FIG. 2, an embodiment of a method for publishing software version of diagnostic equipment provided by the present application comprises:

step 201, extracting all instructions sent from an upper computer to a lower computer in a software version to be published by the diagnostic equipment;

step 202, generating a set of instructions by the all instructions; and step 203, associating the set of instructions with the software version to be published and publishing them on a designated server.

Regarding the aforesaid step 201, in the software version to be published, all instructions sent from the upper computer to the lower computer legally are stipulated, there are generally certain differences in these legalized instructions for different software versions. Firstly, these instructions in the software version to be published can be extracted.

Regarding the aforesaid step 202, it can be understood that, in order to prevent these instructions from being filched easily after they are published, when the set of instructions are generated, it is possible to encrypt and store these instructions, thereby obtaining the set of instructions corresponding to the software version.

Regarding the aforesaid step 203, when the set of instructions are published, the set of instructions and the corresponding software version are associated and published on the designated server such as a designated software version publishing platform, or a third software version publishing website, etc.

It can be understood that, after the software version of the diagnostic equipment is published on the designated server, a user can download the latest software version from the server, and thereby implementing an updating of the diagnostic equipment. Firstly, the user selects a certain software version of the diagnostic equipment on the server, which is usually the latest software version; next, the server judges whether a request for downloading this software version is legalized, if the request for downloading this software version is illegalized, the request for downloading is rejected; if the request for downloading this software version is legalized, following steps are performed. The server can generate a version certificate corresponding to the software version, that is, License, and then encrypt the version certificate and the set of instructions associated with the software version to generate first verification data (it needs to be noted that, this version certificate is not essential, the server may need not to generate the version certificate, but encrypts the set of instructions directly, thereby obtaining the first verification data); and then, the software version and the first verification are downloaded by the server and stored in a client-side by which a software update of the diagnostic equipment is accomplished according to the downloaded software version, the updated diagnostic equipment carries the first verification data along with the client-side, too.

From the contents described above, it is known that, the first verification data is equivalent to recording a track of behavior of the current software version of the diagnostic equipment, runs through a whole process of publishing, downloading and using of the software version, and thus can be used by the lower computer in use for verifying instructions of the upper computer, thereby preventing the lower computer from been cheated.

Step 102, decrypting the first verification data to obtain the set of instructions.

It can be understood that, in order to improve a safety of the first verification data, the server generates the first verification data by decrypting and according to the set of instructions. Therefore, the lower computer needs to decrypt the first verification data to obtain the set of instructions.

Further, it can be known from what descripted above that, the server can also generate the version certificate corresponding to the software version. Therefore, the first verification data can also include the version certificate which is generated by the server configured to provide updated software version. At this time, the step 102 is specifically: decrypting the first verification to obtain the set of instructions and the version certificate. Then, before comparing the instruction data received from the upper computer with the set of instructions, the lower computer can check whether the version certificate is legalized. If the version certificate is legalized, a following step 103 is executed; if the version certificate is illegal, this diagnosis operation is ended. It can be seen that, after the version certificate is added, the lower computer can judge whether the first verification data itself is legalized by verifying the version certificate, thereby further reducing a possibility that an illegal person implements a cheating by falsifying the first verification data itself, and improving a creditability of the first verification data.

Step 103, comparing the instruction data received from the upper computer with the set of instructions, and judging whether the instruction data comply with the set of instructions, if yes, executing a step 104, if no, executing a step 105.

Step 104, executing the instruction data.

Step 105, refusing to execute the instruction data.

Regarding the aforesaid steps 103-105, it can be understood that, after the set of instructions of the current version of the diagnostic equipment are obtained, the lower computer can compare the instruction data received from the upper computer with the set of instructions, and judge whether the instruction data comply with the set of instructions; if the instruction data meets the requirement, the instruction data is executed, and an execution result can also be fed back to the upper computer; otherwise, if the instruction data doesn't meet the requirement, an execution of these instruction data is refused, and this diagnosis operation can be ended.

Wherein, if the set of instructions are encrypted, before executing step 103 of comparing the instruction data received from the upper computer with the set of instructions, the set of instructions are decrypted firstly, and then the instruction data is compared with each of instructions in the set of instructions one by one.

Furthermore, the step 103 of judging whether the instruction data comply with the set of instructions specifically comprises: judging whether the instruction data belongs to the set of instructions; if the instruction data belongs to the set of instructions, it is determined that the instruction data comply with the set of instructions; if the instruction data doesn't belong to the set of instructions, it is determined that the instruction data doesn't comply with the set of instructions. It can be understood that, the set of instructions can generally perform exhaustion for all instructions sent from the upper computer to the lower computer. When the instruction data received by the lower computer doesn't belong to any one in the set of instructions, it means that the instruction data is illegal, and thus it is determined that the instruction data doesn't comply with the set of instructions, so that the execution of the instruction data is refused.

Figure 3:
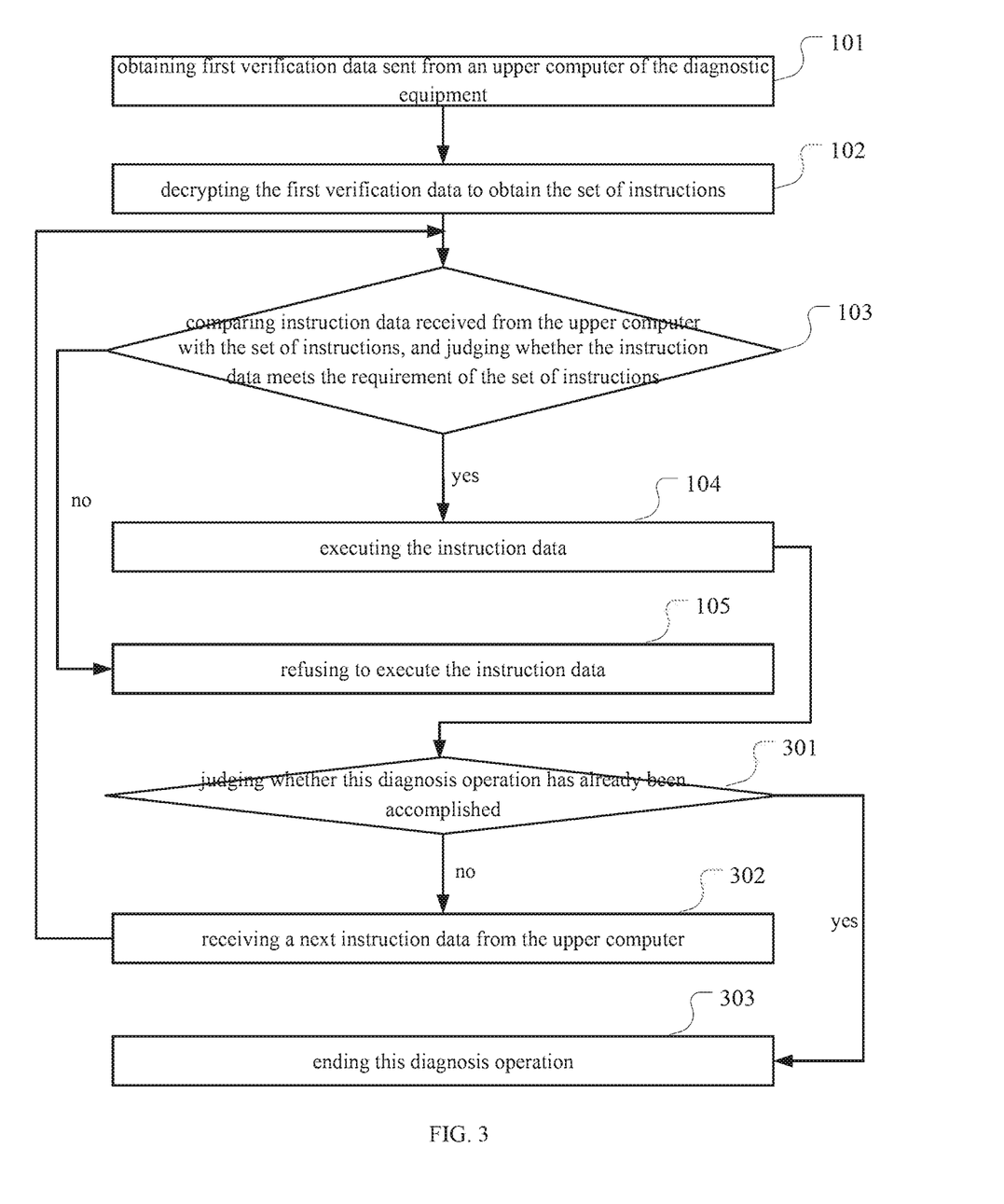
FIG. 3 illustrates a schematic flow chart of the method for verifying instructions of the diagnostic equipment in an application scenario in another embodiment of the present application.

Furthermore, as shown in FIG. 3, after the instruction data is executed, the method for verifying instructions can further comprises:

step 301, judging whether this diagnosis operation has been accomplished, if no, executing a step 302; if yes, executing a step 303;

step 302, receiving next instruction data from the upper computer, returning back to execute the step 103;

step 303, ending this diagnosis operation.

Regarding the aforesaid steps 301-303, it can be understood that, in a diagnosing process, the upper computer may need to send a plurality of pieces of instruction data to the lower computer, therefore, after the lower computer has executed one piece of instruction data, whether this diagnosis operation has already been accomplished needs to be judged. There are many ways to judge whether this diagnosis operation has been accomplished, for example, a first way is that: if the lower computer receives the next piece of instruction data, it is determined that this diagnosis operation hasn't been accomplished, otherwise, it is determined that this diagnosis operation has been accomplished; a second way is that: the lower computer monitors whether an end instruction from the upper computer is received; if the lower computer receives the end instruction, it is determined that that this diagnosis operation hasn't been accomplished, otherwise, it is determined that this diagnosis operation has been accomplished. In this regard, this embodiment won't enumerate one by one.

When this diagnosis operation hasn't been accomplished, the lower computer receives the next piece of instruction data from the upper computer, and then return back to execute the aforesaid step 103 so as to verify and process the next piece of instruction data again, said diagnosis operation is repeatedly executed in this way, and until it is determined that this diagnosis has been accomplished, the current diagnosis operation is ended.

In this embodiment, the lower computer of the diagnostic equipment obtains the first verification data sent by the upper computer of the diagnostic equipment firstly, the diagnostic equipment carries the first verification data when a software version of the diagnostic equipment is updated, the first verification data is encrypted and comprises the set of instructions sent from the upper computer to the lower computer in the corresponding software version; then, the first verification data is decrypted, and the set of instructions are obtained; next, the instruction data received from the upper computer is compared with the set of instructions, and whether the instruction data comply with the set of instructions is judged. If the instruction data comply with the set of instructions, the instruction data is executed; if the instruction data doesn't comply with the set of instructions, the execution of the instruction data is refused. In this embodiment, since the diagnostic equipment carries the set of instructions sent from the upper computer to the lower computer in the software version when it updates the software version, after the lower computer receives the instruction data from the upper computer, whether the instruction data comply with the set of instructions can be judged, and thus a verification of the instruction data can be accomplished, any possibility of reversely using data of a certain vehicle type to cheat the lower computer of the diagnostic equipment through the upper computer is excluded, and thus a safety of the lower computer of the diagnostic equipment is improved.

It should be understood that, value of serial number of the steps in the aforesaid embodiment doesn't mean a sequencing of execution sequences of the steps, the execution sequence of each of the steps should be determined by functionalities and internal logics of the steps themselves, and shouldn't be regarded as limitation to an implementation process of the embodiment of the present application.

The method for verifying instructions of the diagnostic equipment is mainly described above, and a device for verifying instructions of diagnostic equipment will be described in detail below.

Figure 4:
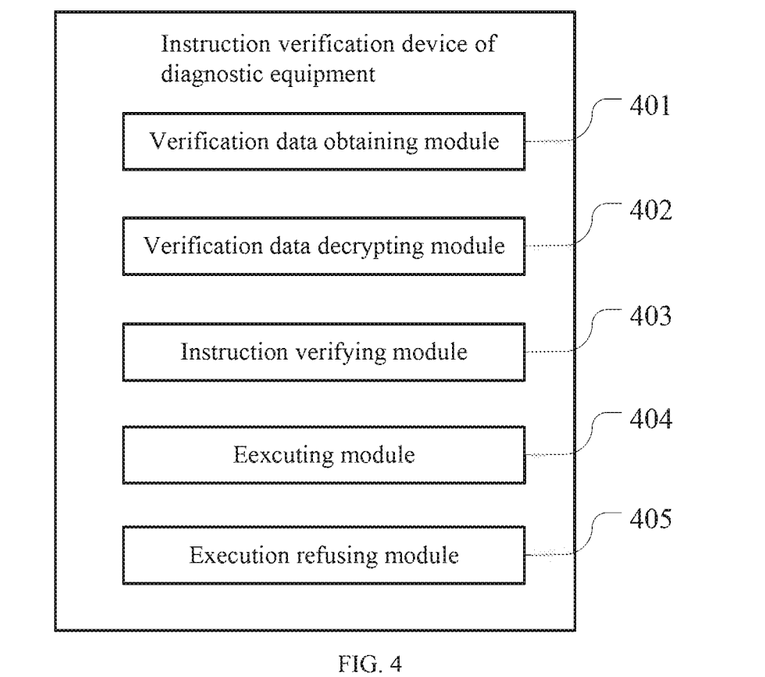
FIG. 4 illustrates an exemplary structural view of a device for verifying instructions of the diagnostic equipment in another embodiment of the present application.

FIG. 4 illustrates an exemplary structural view of a device for verifying instructions of the diagnostic equipment in another embodiment of the present application.

In this embodiment, a device for verifying instructions of the diagnostic equipment is provided, the device for verifying instructions of the diagnostic equipment is arranged in a lower computer of the diagnostic equipment, and comprises:

an verification data obtaining module 401 configured to obtain first verification data sent from an upper computer of the diagnostic equipment, the diagnostic equipment carries the first verification data when a software version of the diagnostic equipment is updated, the first verification data is encrypted and comprises a set of instructions sent from the upper computer to the lower computer in a corresponding software version;

a verification data decrypting module 402 configured to decrypt the first verification data to obtain the set of instructions; and an instruction verification module 403 configured to compare instruction data received from the upper computer with the set of instructions, and judge whether the instruction data comply with the set of instructions;

an execution module 404 configured to, if the instruction data comply with the set of instructions, execute the instruction data; and an execution refusing module 405 configured to, if the instruction data doesn't comply with the set of instructions, refuse to execute the instruction data.

Further, the first verification data can further comprise a version certificate which is generated by a server configured to provide updated software version;

the verification data decrypting module 402 is specifically configured to decrypt the first verification data to obtain the set of instructions and the version certificate.

The device for verifying instructions further comprises:

a certificate checking module configured to check whether the version certificate is legalized;

a triggering module configured to, if the version certificate is legalized, trigger the certificate verification module; and a diagnosis ending module configured to, if the version certificate is illegal, end this diagnosis operation.

Furthermore, the device for verifying instructions further comprises:

a diagnosis accomplishment judging module configured to judge whether this diagnosis operation has already been accomplished;

an instruction receiving module configured to, if the diagnosis accomplishment judging module gets a negative judgment, receive next instruction data from the upper computer to trigger the instruction verification module again; and an operation ending module configured to, if the diagnosis accomplishment judging module gets a positive judgment, end this diagnosis operation.

Furthermore, the instruction verification module 403 can further comprises:

an instruction judging unit configured to judge whether the instruction data belongs to the set of instructions;

a first determining unit configured to, if the instruction judging unit gets a positive judgment, determine that the instruction comply with the set of instructions;

a second determining unit configured to, if the instruction judging unit gets a negative judgment, determine that the instruction doesn't comply with the set of instructions.

Furthermore, the first verification data is obtained by using a server configured to provide updated software version to encrypt a pre-stored set of instructions corresponding to a software version that is required to be downloaded after the server receives a software version download instruction; the pre-stored set of instructions can be a set of instruction that is generated, after all instructions sent from the upper computer to the lower computer in a software version to be published by the diagnostic equipment are extracted by a software version publisher, by the all instructions, and the set of instructions and the software version to be published are associated and published on the server configured to provide updated software version.

Figure 5:
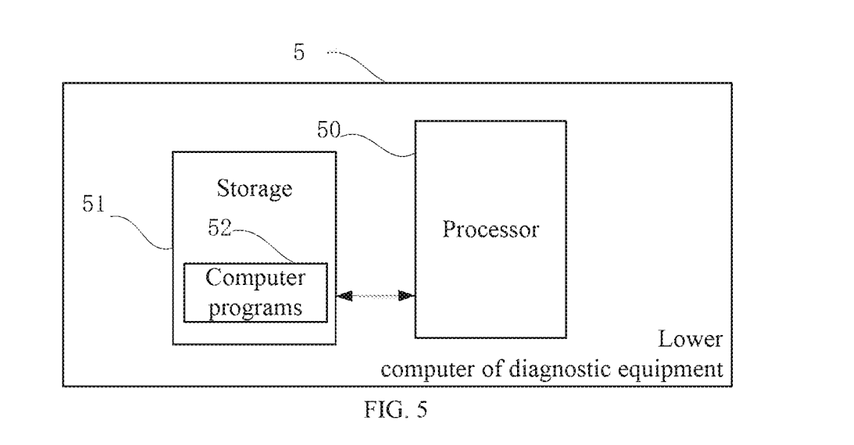
FIG. 5 illustrates a schematic view of a lower computer of the diagnostic equipment provided by an embodiment of the present application.

FIG. 5 illustrates a schematic view of a lower computer of diagnostic equipment provided by another embodiment of the present application. As shown in FIG. 5, the lower computer 5 of the diagnostic equipment in this embodiment comprises: a processor 50, a storage device 51, and computer programs 52 stored in the storage device 51 and executable on the processor 50, such as the programs configured to executing the aforesaid method for verifying instructions of the diagnostic equipment. The processor 50 implements the following steps when executing the computer programs 52:

obtaining first verification data sent from an upper computer of the diagnostic equipment, the diagnostic equipment carries the first verification data when a software version of the diagnostic equipment is updated, the first verification data is encrypted and contains a set of instructions sent from the upper computer to the lower computer in a corresponding software version;

decrypting the first verification data to obtain the set of instructions;

comparing the instruction data received from the upper computer with the set of instructions, and judging whether the instruction data comply with the set of instructions;

if the instruction data comply with the set of instructions, executing the instruction data; or if the instruction data doesn't comply with the set of instructions, refusing to execute the instruction data.

Preferably, the first verification data further comprises a version certificate generated by a server configured to provide updated software version;

the step of decrypting the first verification data to obtain the set of instructions specifically comprises:

decrypting the first verification data to obtain the set of instructions and the version certificate;

before comparing the instruction data received from the upper computer with the set of instructions, the method further comprises:

checking whether the version certificate is legalized;

if the version certificate is legalized, executing the step of comparing the instruction data received from the upper computer with the set of instructions;

if the version certificate is illegal, ending this diagnosis operation.

Preferably, after the instruction data is executed, when the processor 50 executes the computer programs 52, the method further comprises:

judging whether this diagnosis operation has already been accomplished;

if this diagnosis operation hasn't been accomplished, receiving a next instruction data from the upper computer, and returning to execute the step of comparing the instruction data received from the upper computer with the set of instructions; or if this diagnosis operation has already been accomplished, ending this diagnosis operation.

Preferably, judging whether the instruction data comply with the set of instructions comprises:

judging whether the instruction data belongs to the set of instructions;

if the instruction data belongs to the set of instructions, determining that the instruction data comply with the set of instructions; or if the instruction data doesn't belong to the set of instructions, determining that the instruction data doesn't comply with the set of instructions.

Preferably, the first verification data is obtained by a server configured to provide updated software version by encrypting a pre-stored set of instructions corresponding to a software version that requires to be downloaded after the server receives a software version download instruction; the pre-stored set of instructions can be, after all instructions sent from the upper computer to the lower computer in a software version to be published by the diagnostic equipment are extracted by a software version publisher, the one generated by the all instructions, and the set of instructions and the software version to be published are associated and published on the server configured to provide updated software version.

Exemplarily, the computer programs 52 can be divided into one or a plurality of module(s)/unit(s), the one or plurality of module(s)/unit(s) is/are stored in the storage device 51 and executed by the processor 50, thereby implementing the present application. The one or plurality of module(s)/unit(s) can be a series of computer program instruction segments capable of accomplishing specific functionalities, these instruction segments are used for describing an executive process of the computer programs 52 in the lower computer 5 of the diagnostic equipment.

The lower computer 5 of the diagnostic equipment can include but is not limited to the processor 50 and the storage device 51. It can be understood for one of ordinary skill in the art that, FIG. 5 is merely an example of the lower computer 5 of the diagnostic equipment, and is not constituted as limitation to the lower computer 5 of the diagnostic equipment, the lower computer 5 can include more or less components shown in FIG. 5, or combine some components or different components, for example, the lower computer 5 of the diagnostic equipment can also include an input and output device, a network access device, a bus, and so on.

The processor 50 can be a CPU (Central Processing Unit), and can also be other general purpose processor, DSP (Digital Signal Processor), ASIC (Application Specific Integrated Circuit), FGPA (Field-Programmable Gate Array), or be some other programmable logic devices, discrete gate or transistor logic devices, discrete hardware components, etc. The general purpose processor can be a MCU (Micro Processing Unit), or alternatively, the processor can also be any conventional processor, etc.

The storage device 51 can be an internal storage unit of the lower computer 5 of the diagnostic equipment, such as a hard disk or a memory of the lower computer 5 of the diagnostic equipment. The storage device 51 can also be an external storage device of the lower computer 5 of the diagnostic equipment, such as a plug-in hard disk, a SMC (Smart Media Card), a SD (Secure Digital) card, a FC (Flash Card) equipped on the lower computer 5 of the diagnostic equipment. Further, the storage device 51 may include both the internal storage unit and the external storage device of the lower computer 5 of the diagnostic equipment, either. The storage device 51 is configured to storing the computer programs, and other procedures and data needed by the lower computer 5 of the diagnostic equipment. The storage device 51 can also be configured to temporarily storing data that has been output or being ready to be output.

The various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by the computer programs configured to instruct relevant hardware. The computer programs can be stored in a computer readable storage medium, when the computer programs are executed by the processor, the following steps can be implemented:

obtaining first verification data sent from an upper computer of the diagnostic equipment, the diagnostic equipment carries the first verification data when it updates a software version, the first verification data is encrypted and contains a set of instructions sent from the upper computer to the lower computer in a corresponding software version.

decrypting the first verification data to obtain the set of instructions;

comparing the instruction data received from the upper computer with the set of instructions, and judging whether the instruction data comply with the set of instructions;

if the instruction data comply with the set of instructions, executing the instruction data; or if the instruction data doesn't comply with the set of instructions, refusing to execute the instruction data.

Preferably, the first verification data further comprises a version certificate generated by a server configured to provide updated software version;

the step of decrypting the first verification data to obtain the set of instructions specifically comprises:

decrypting the first verification data to obtain the set of instructions and the version certificate;

before comparing the instruction data received from the upper computer with the set of instructions, the method further comprises:

checking whether the version certificate is legalized;

if the version certificate is legalized, executing the step of comparing the instruction data received from the upper computer with the set of instructions;

if the version certificate is illegal, ending this diagnosis operation.

Preferably, after the instruction data is executed, the method further comprises:

judging whether this diagnosis operation has already been accomplished;

if this diagnosis operation hasn't been accomplished, receiving a next instruction data from the upper computer, and returning to execute the step of comparing the instruction data received from the upper computer with the set of instructions;

if this diagnosis operation has already been accomplished, ending this diagnosis operation.

Preferably, judging whether the instruction data comply with the set of instructions comprises:

judging whether the instruction data belongs to the set of instructions;

if the instruction data belongs to the set of instructions, determining that the instruction data comply with the set of instructions;

if the instruction data doesn't belong to the set of instructions, determining that the instruction data doesn't comply with the set of instructions.

Preferably, the first verification data is obtained by a server configured to provide updated software version by encrypting a pre-stored set of instructions corresponding to a software version that requires to be downloaded after the server receives a software version download instruction; the pre-stored set of instructions can be, after all instructions sent from the upper computer to the lower computer in a software version to be published by the diagnostic equipment are extracted by a software version publisher, the one generated by the all instructions, and the set of instructions and the software version to be published are associated and published on the server configured to provide updated software version.

Wherein, the computer programs comprise computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc. It needs to be explained that, the contents contained in the computer readable medium can be added or reduced appropriately according to the requirement of legislation and patent practice in a judicial district, for example, in some judicial districts, according to legislation and patent practice, the computer readable medium doesn't include electrical carrier signal and telecommunication signal.

As stated above, the aforesaid embodiments are only intended to explain but not to limit the technical solutions of the present application. Although the present application has been explained in detail with reference to the above-described embodiments, it should be understood for the one of ordinary skill in the art that, the technical solutions described in each of the above-described embodiments can still be amended, or some technical features in the technical solutions can be replaced equivalently; these amendments or equivalent replacements won't make the essential of corresponding technical solution to be broken away from the spirit and the scope of the technical solution in various embodiments of the present application.

What is claimed is:

1. A method for verifying instructions of diagnostic equipment, wherein the method for verifying instructions of diagnostic equipment is applied in a lower computer of the diagnostic equipment and comprises:

obtaining first verification data sent from an upper computer of the diagnostic equipment, wherein the diagnostic equipment carries the first verification data when a software version of the diagnostic equipment is updated, the first verification data is encrypted and comprises a set of instructions sent from the upper computer to the lower computer in a corresponding software version;

decrypting the first verification data to obtain the set of instructions; and comparing instruction data received from the upper computer with the set of instructions, and judging whether the instruction data complies with the set of instructions;

executing the instruction data if the instruction data complies with the set of instructions; or refusing to execute the instruction data if the instruction data doesn't comply with the set of instructions;

wherein the first verification data further comprises a version certificate generated by a server;

a step of decrypting the first verification data to obtain the set of instructions specifically comprises:

decrypting the first verification data to obtain the set of instructions and the version certificate;

before comparing the instruction data received from the upper computer with the set of instructions, the method further comprises:

checking whether the version certificate is legalized;

executing the step of comparing the instruction data received from the upper computer with the set of instructions if the version certificate is legalized; or ending this diagnosis operation if the version certificate is illegal.

2. The method for verifying instructions of diagnostic equipment according to claim 1, wherein after the instruction data is executed, the method further comprises:

judging whether this diagnosis operation has already been accomplished;

receiving a next instruction data from the upper computer, and returning to execute the step of comparing the instruction data received from the upper computer with the set of instructions, if this diagnosis operation hasn't been accomplished; or ending this diagnosis operation, if this diagnosis operation has been accomplished.

3. The method for verifying instructions of diagnostic equipment according to claim 1, wherein judging whether the instruction data complies with the set of instructions comprises:

judging whether the instruction data belongs to the set of instructions;

determining that the instruction data complies with the set of instructions, if the instruction data belongs to the set of instructions; or determining that the instruction data doesn't comply with the set of instructions, if the instruction data doesn't belong to the set of instructions.

4. The method for verifying instructions of diagnostic equipment according to claim 1, wherein the first verification data is obtained by using the server configured to provide updated software version to encrypt a pre-stored set of instructions corresponding to a software version that is required to be downloaded after the server receives a software version download instruction; the pre-stored set of instructions is a set of instructions, after all instructions sent from the upper computer to the lower computer in a software version to be published by the diagnostic equipment are extracted by a software version publisher, generated by the all instructions; the set of instructions and the software version to be published are associated and published on the server configured to provide updated software version.

5. The method for verifying instructions of diagnostic equipment according to claim 1, wherein the first verification data is obtained by using the server to encrypt a pre-stored set of instructions corresponding to a software version that is required to be downloaded after the server receives a software version download instruction; the pre-stored set of instructions is a set of instructions, after all instructions sent from the upper computer to the lower computer in a software version to be published by the diagnostic equipment are extracted by a software version publisher, generated by the all instructions; the set of instructions and the software version to be published are associated and published on the server configured to provide updated software version.

6. The method for verifying instructions of diagnostic equipment according to claim 1, wherein the first verification data further comprises a version certificate generated by a server;
   a step of decrypting the first verification data to obtain the set of instructions specifically comprises:
   decrypting the first verification data to obtain the set of instructions and the version certificate;
   before comparing the instruction data received from the upper computer with the set of instructions, the method further comprises:
   checking whether the version certificate is legalized;
   executing the step of comparing the instruction data received from the upper computer with the set of instructions if the version certificate is legalized; or
   ending this diagnosis operation if the version certificate is illegal;
   wherein the first verification data is obtained by using the server configured to provide updated software version to encrypt a pre-stored set of instructions corresponding to a software version that is required to be downloaded after the server receives a software version download instruction; the pre-stored set of instructions is a set of instructions, after all instructions sent from the upper computer to the lower computer in a software version to be published by the diagnostic equipment are extracted by a software version publisher, generated by the all instructions; the set of instructions and the software version to be published are associated and published on the server configured to provide updated software version.

7. The method for verifying instructions of diagnostic equipment according to claim 1, wherein judging whether the instruction data complies with the set of instructions comprises:
   judging whether the instruction data belongs to the set of instructions;
   determining that the instruction data complies with the set of instructions if the instruction data belongs to the set of instructions; or
   determining that the instruction data doesn't comply with the set of instructions if the instruction data doesn't belong to the set of instructions;
   wherein the first verification data is obtained by using the server to encrypt a pre-stored set of instructions corresponding to a software version that is required to be downloaded after the server receives a software version download instruction; the pre-stored set of instructions is a set of instructions, after all instructions sent from the upper computer to the lower computer in a software version to be published by the diagnostic equipment are extracted by a software version publisher, generated by the all instructions; the set of instructions and the software version to be published are associated and published on the server configured to provide updated software version.

8. A lower computer of diagnostic equipment comprising a storage device which stores computer program, and a processor configured to:
   obtain first verification data sent from an upper computer of the diagnostic equipment, wherein the diagnostic equipment carries the first verification data when a software version of the diagnostic equipment is updated, the first verification data is encrypted and comprises a set of instructions sent from the upper computer to the lower computer in a corresponding software version;
   decrypt the first verification data to obtain the set of instructions; and
   compare instruction data received from the upper computer with the set of instructions, and judge whether the instruction data complies with the set of instructions;
   execute the instruction data if the instruction data complies with the set of instructions; or
   refuse to execute the instruction data if the instruction data doesn't comply with the set of instructions;
   wherein the first verification data further comprises a version certificate generated by a server, the processor is further configured to:
   decrypt the first verification data to obtain the set of instructions and the version certificate;
   check whether the version certificate is legalized before comparing the instruction data received from the upper computer with the set of instructions;
   execute the step of comparing the instruction data received from the upper computer with the set of instructions if the version certificate is legalized; or
   end this diagnosis operation if the version certificate is illegal.

9. The lower computer of diagnostic equipment according to claim 8, wherein the processor is further configured to
   judge whether this diagnosis operation has already been accomplished;
   receive next instruction data from the upper computer, and return to execute the step of comparing the instruction data received from the upper computer with the set of instructions, if this diagnosis operation hasn't been accomplished; or
   end this diagnosis operation, if this diagnosis operation has been accomplished.

10. The lower computer of diagnostic equipment according to claim 8, wherein the processor is further configured to:
    judge whether the instruction data belongs to the set of instructions;
    determine that the instruction data complies with the set of instructions if the instruction data belongs to the set of instructions; or
    determine that the instruction data doesn't comply with the set of instructions, if the instruction data doesn't belong to the set of instructions.

11. The lower computer of diagnostic equipment according to claim 8, wherein the first verification data is obtained by using the server configured to provide updated software version to encrypt a pre-stored set of instructions corresponding to a software version that is required to be downloaded after the server receives a software version download instruction; the pre-stored set of instructions is a set of instructions, after all instructions sent from the upper computer to the lower computer in a software version to be published by the diagnostic equipment are extracted by a software version publisher, generated by the all instructions; the set of instructions and the software version to be published are associated and published on the server configured to provide updated software version.

12. A computer readable storage device medium which stores computer programs, wherein the computer programs implement the steps of the method for verifying instructions of the diagnostic equipment according to claim 1, when being executed by a processor.

* * * * *